United States Patent
Meinzer et al.

[11] Patent Number: 5,593,737
[45] Date of Patent: Jan. 14, 1997

[54] PHOTOCATALYTIC SEMICONDUCTOR COATING PROCESS

[75] Inventors: Richard A. Meinzer, Glastonbury; Philip J. Birbara, Windsor Locks, both of Conn.

[73] Assignee: United Technologies Corporation, Hartford, Conn.

[21] Appl. No.: 448,147

[22] Filed: May 23, 1995

[51] Int. Cl.⁶ .................... C08J 7/06; C03C 25/02
[52] U.S. Cl. ............... 427/512; 204/157.3; 204/157.44; 427/553
[58] Field of Search .................. 204/157.3, 157.44, 204/157.47, 157.48; 427/512, 553

[56] References Cited

U.S. PATENT DOCUMENTS

| | | | |
|---|---|---|---|
| 4,892,712 | 1/1990 | Robertson et al. | 422/186 |
| 4,954,465 | 9/1990 | Kawashima et al. | 502/5 |
| 4,966,665 | 10/1990 | Ibosuki et al. | 204/157.3 |
| 5,032,241 | 7/1991 | Robertson et al. | 204/157.15 |
| 5,045,288 | 9/1991 | Raupp et al. | 422/186.3 |
| 5,078,971 | 1/1992 | Matuda et al. | 422/121 |
| 5,096,745 | 3/1992 | Anderson et al. | 427/226 |

FOREIGN PATENT DOCUMENTS

| | | |
|---|---|---|
| 499363 | 8/1992 | European Pat. Off. |
| 2-107314 | 4/1990 | Japan. |
| 3-94814 | 3/1991 | Japan. |
| 3-233100 | 10/1991 | Japan. |
| 5-17153 | 1/1993 | Japan. |

OTHER PUBLICATIONS

Photocatalytic Purification and Treatment of Water and Air, 1993 Elsevier Science Published B.V., pp. 121–122, "Photocatalysis In Water Purification: Possibilities, Problems And Prospects", Ralph W. Matthews.

Ibuski et al, Removal of Low Concentration Nitrogen Oxides through Photoassisted Catalysis Journal of Molecularal Catalysis 00 (1993) Elsevier Science Publishers Amsterdam.

Peru et al, Development & Optimization of a $TiO_2$ Coated Fiber Optic Cable Reactor: Photo Catalytic Degradation of 4 Chlorophenol. Environmental Engineering Science. W W Keck Laboratories California Institute of Technology Pasadena CA Jan. 1995.

The First International Conference, 8–13 Nov. 1992, Cover Sheet, Table of Contents, pp. 1–9, "$TiO_2$ Photocatalytic Purification And Treatment Of Water And Air".

Ibid "Mechanism And By–Products Of The $TiO_2$ Mediated Photo–Oxidation Of Trichloroethylene And Tetrachloroethylene In Aqueous Solutions", William H. Glaze, John F. Kenneke and John L. Ferry, pp. 39–40.

Ibid "Application Of Thin Film $TiO_2$ Photocatalyst: Lighting System With Deodorizing Function", Kazuhito Hashimoto and Akira Fujishima, pp. 190–191.

Ibid "An Interior–Finishing Material With An Odor Control Function Coated By A Photocatalytic $TiO_2$ Thin Film", Takatoshi Ogawa, Toshio Saito, Tamotsu Hasegawa, Hiroshi Shinozaki, Kazuito Hashimoto and Akira Fujishima, pp. 192–193.

Ibid "Photocatalytic Activity Of $TiO_2$ Thin Film Under Room Light", Toshiya Watanabe, Atushi Kitamura, Eiichi Kojima, Chiaki Nakayama, Kazuhito Hashimoto and Akira Fujishima, pp. 202–203.

J. Phys. Chem., 1988, 92, pp. 5726–5731, "Kinetic Studies in Heterogeneous Photocatalysis. 1. Photocatalytic Degradation of Chlorinated Phenols in Aerated Aqueous Solutions over $TiO_2$ Supported on a Glass Matrix", Hussain Al–Ekahi and Nick Serpone.

(List continued on next page.)

Primary Examiner—Gary P. Straub
Attorney, Agent, or Firm—Pamela J. Curbelo

[57] ABSTRACT

The present invention discloses a simplified method for coating a substrate with photocatalytic semiconductor by mixing photocatalytic semiconductor powder with water to form a mixture, reducing said pH of the mixture to below about 4, emulsifying the mixture, coating the substrate therewith, and illuminating the coated substrate with ultraviolet.

10 Claims, 1 Drawing Sheet

OTHER PUBLICATIONS

J. Phys. Chem., 1984, 88, pages 1302–1307, "Optimization of Conditions for Photochemical Water Cleavage. Aqueous Pt/TiO$_2$ (Anatase) Dispersions under Ultraviolet Light", J. Kiwi and M. Gratzel.

Journal of Catalysis, 136, 1992, pp. 554–565, "Heterogeneous Photocatalytic Oxidation of Gas–Phase Organics for Air Purification: Acetone, 1–Butanol, Butyraldehyde, Formaldehyde, and m–Xylene Oxidation", Jose Peral and David F. Ollis.

Photocatalytic Purification and Treatment of Water and Air, pp 121–122, "Photocatalysis In Water Purification: Possibilities, Problems And Prospects", Ralph W. Matthews.

Materials Research Society Suymposium Proceedings, vol. 132, 8 pages, Nov. 30–Dec. 1, 1988, "Multicomponent Ultrafine Microstructure", L. E. McCandlish, D. E. Polk, R. W. Siegel, B. H. Kear.

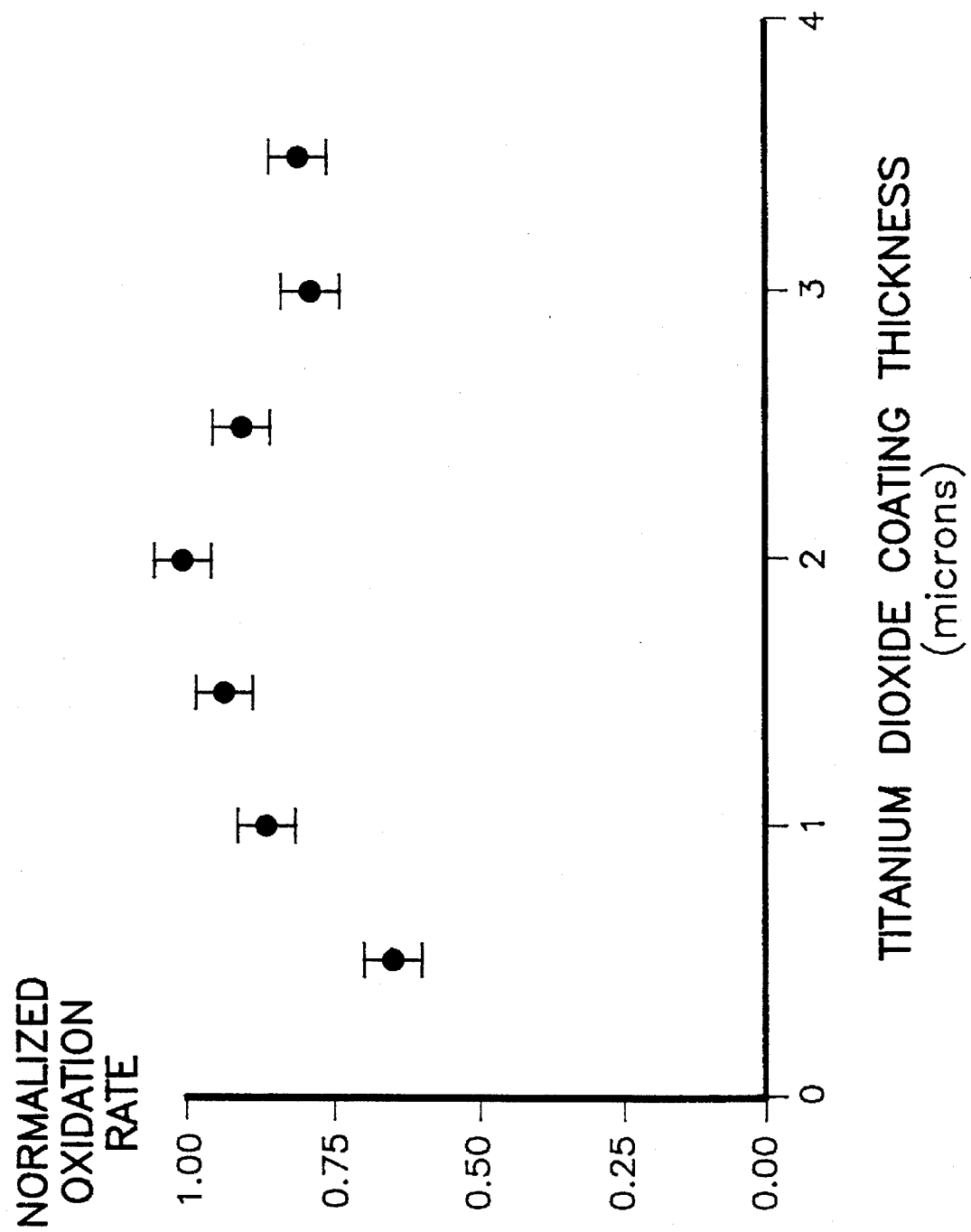

PHOTOCATALYTIC SEMICONDUCTOR COATING PROCESS

TECHNICAL FIELD

The present invention relates to coating substrates, and especially relates to coating substrates with a photocatalytic semiconductor.

BACKGROUND OF THE INVENTION

Conventionally, coating substrates with a photocatalytic semiconductor such as titanium dioxide comprises employing various sol-gel processes. For example, the production of titanium dioxide ($TiO_2$) lyophobic sols comprises: hydrolyzing titanium alkoxide in an aqueous system and peptizing the resulting $TiO_2$ precipitates with appropriate amounts of acid at 80° C. in an ultrasonic field. Due to the complexity of peptization and the fact that the average particle size in the end product depends upon the relative rates of breakdown and aggregation, significant consideration is given to the pH of the solution, ionic strength, particle concentration, and temperature. Once peptized, the sol to gel transformation occurs via water evaporation from the sol. The gel is then heated to form the crystalline form of the $TiO_2$. Removal of physically absorbed water and organic solvents occurs at 100° C., burning off of bonded organic groups and nitrate ligands occurs at 200°–350° C., crystallization of $TiO_2$ occurs at 350°–450° C., and conversion of anatase to rutlie phase occurs at 450°–600° C. (see *Physical-Chemical Properties of $TiO_2$ Membranes Controlled by Sol-Gel Processing,* Qunyin Xu and Mark Anderson, published in *Multicomponent Ultrafine Microstructure,* Mat. Res. Soc. Symp. Proc. Vol. 132, pp. 41–46(1989)). Although sol-gel processes produce stable solutions where the $TiO_2$ remains in solution during the coating process, these processes are typically time consuming, energy intensive, and laborious.

Another process previously employed to coat substrates with a photocatalytic semiconductor comprised sonicating a slurry of $TiO_2$ and water to form a suspension, covering the substrate with the suspension, and evaporating the suspension to dryness with a vacuum and heat. Due to the use of the heat, this process can produce a coating with poor adhesion.

What is needed in the art is a simplified method for coating a substrate with $TiO_2$.

DISCLOSURE OF THE INVENTION

The present invention discloses a simplified method for coating a substrate with a photocatalytic semiconductor by mixing photocatalytic semiconductor powder with water to form a mixture, reducing said pH of the mixture to below about 4, sonicating the mixture, coating the substrate therewith, and illuminating the coated substrate with UV.

The foregoing and other features and advantages of the present invention will become clear from the following description and drawings.

BRIEF DESCRIPTION OF THE DRAWINGS

The Figure is a graph of the normalized oxidation rate of formaldehyde to carbon dioxide and water as a function of coating thickness.

BEST MODE FOR CARRYING OUT THE INVENTION

The present invention comprises a simplified, unique method of coating a substrate with photocatalytic semiconductor. This method, which is an essentially ambient temperature (about 15° C. to about 30° C.) coating process, comprises: mixing photocatalytic semiconductor powder with water, acidifying the mixture, sonicating the acidified mixture, coating the substrate with the sonicating mixture, and illuminating the coated substrate with UV.

The photocatalytic semiconductor powder is dispersed in sufficient water, preferably deionized water, to form a mixture and prevent aggregation of the photocatalytic semiconductor particles. Typically the mixture contains about four parts photocatalytic semiconductor powder to about one part water. Additional water content will favor thinner coatings per coating application.

The photocatalytic semiconductor is a compound activated by light within its band gap and capable of dissociating water molecules to form hydroxyl radicals which oxidize the organic pollutants. Some such photocatalytic semiconductors include metal oxides such as: tin dioxide (SnO2), titanium dioxide ($TiO_2$), zinc oxide (ZnO), tungsten trioxide ($WO_3$), lead oxide (PbO), iron titanium trioxide ($FeTiO_3$), vanadium pentoxide ($V_2O_5$), iron oxide ($Fe_2O_3$), and others such as cadmium sulfide (CdS). Preferably the photocatalytic semiconductor has an optical absorption band close to visible light, is not readily poisoned by compounds in air such as organic pollutants, and does not itself readily oxidize or evaporate. One such photocatalytic semiconductor is $TiO_2$ which is inexpensive, stable, environmentally sound, resistant to poisoning, and readily activated by ultraviolet (UV) with wavelengths less than about 400 nanometers (nm).

The $TiO_2$, which can be a substantially pure anatase crystalline phase of $TiO_2$, the active form thereof, is preferably a mixture of anatase and rutlie $TiO_2$. It has been discovered that a coating having greater than about 60% by weight (wt %) anatase, balance rutlie, has a higher reactivity than a coating formed of pure anatase $TiO_2$. Consequently, the use of $TiO_2$ powder comprising about 60 wt % to about 90 wt % anatase, balance rutlie is preferred, with about 70 wt % to about 80 wt % anatase, balance rutlie especially preferred.

The preferred particle sizes of the photocatalytic semiconductor powder substantially dependent upon its surface area and the desired coating thickness; minimum attainable coating thickness increases with increased particle size. The particle's surface area should be maximized while attaining the desired thickness of the coating. Coatings having a thickness up to and exceeding about 100 microns ($\mu$) have been employed in some applications, with a thickness up to about 10.0 $\mu$ being common, up to about 5.0 $\mu$ preferred, and about 0.5 $\mu$ to about 4.0 $\mu$ especially preferred for oxidation of organic particles in a gaseous stream. The Figure shows an oxidation performance plot as a function of thickness where about 1.0 $\mu$ to about 3.0 $\mu$ is shown to be preferred for the destruction of formaldehyde in a gaseous stream to carbon dioxide and water.

Once the mixture has been formed, it is acidified to further inhibit agglomeration of the photocatalytic semiconductor particles in the mixture and to increase the substantially homogenous suspension time of the photocatalytic semiconductor particles. It is conjectured that the acid contributes to charging the particles; hence reducing the potential of the photocatalytic semiconductor particles to come together.

Preferably, the pH of the mixture is reduced to below about 4, with a pH below about 3 preferred, and a pH of about 2 or below especially preferred. Any acid which does not degrade the photocatalytic semiconductor and can be readily removed from the coating can be employed, such as formic acid, hydrogen chloride, nitric acid, acetic acid, and others. Hydrogen chloride is especially preferred since it does not react with the photocatalytic semiconductor and can be readily removed from the coating due to its volatile characteristics at temperatures below 100° C.

In addition to the use of the acid to improve the mixture's coating ability, a small amount of surfactant, such as an alcohol, including isopropyl alcohol, ethanol, and others, or other relatively volatile organic such as acetone and others, can be used to reduce the surface tension of the mixture, thereby improving the wettability characteristics of the mixture when contacting the substrate's surface. Typically, the ratio of mixture to alcohol is about 100:1 to about 10:1, with about 60:1 to about 40:1 preferred.

Once the acid and any alcohol have been added to the mixture, it is sonicated to form a substantially homogeneous mixture which can be used to coat the substrate. Any conventional means for sonicating a mixture can be employed, such as a sonicator unit which employs acoustical energy to mix, dismember, and distribute the photocatalytic semiconductor powder within the liquid phase, a sonic dismembrator, or other device. The substrate can be any medium to which the photocatalytic semiconductor adheres. Some possible substrates include plastic, ceramic, glass, metal, and others in various forms and shapes such as plates, fibers, beads, rods, etc., with UV transparent materials preferred for use in photocatalytic semiconductor air and water purification processes.

Coating the substrate with the sonaticated mixture can employ any conventional process capable of substantially evenly coating the substrate therewith. Some possible coating techniques include, dipping, brushing, spraying, or flow coating, among others.

After the substrate has been coated with the sonicated mixture, the coating is dried. Drying is accomplished via the use of UV or a combination of UV and hot or cool gas (typically room temperature air) blown at the coating. The UV dries and hardens the fibers without requiring a separate drying step. The UV exposure has been found to enhance the adhesion of the coating to the surface.

EXAMPLE

The following example has been used to coat glass fibers (0.5 mm outer diameter, 30 cm long) with a 1 μ $TiO_2$ coating.

1. Degussa Corporation's P25 $TiO_2$ powder (Ridgefield Park, N.J.), 250 cc, was mixed with 1 liter of deionized water.
2. Ten drops of hydrochloric acid was added to the mixture to attain a pH of about 2.
3. Once the desired ph had been obtained, the mixture was then sonicated with a Fisher sonic dismembrator for 15 minutes.
4. Actual coating of the fibers comprised dipping the fibers in the sonicated mixture, twice, with a 30 second pause between dips to allow the draining of excess coating.
5. Drying the coated fibers was accomplished partially with a cool air dryer to remove free water from the coating and thereby shorten the drying process and finally with the application of UV from an arc lamp produced by Oriel Corp., Stratford, Conn., which uses a water filter to remove infrared, to completely dry and harden the coating.

The slurry produced was utilized to coat fibers with a substantially uniform coating having a thickness of about 0.51 μ per dip. The coating was particularly adherent as was supported by break tests where the fibers were bent until they broke to determine if the coating would continue to adhere to the fiber or crumble. In all cases, minus some minor chipping at the break site, the coating adhered to the fiber.

Advantages of the present invention include: the elimination of the heating requirement in the drying/hardening process, the improved adhesion of the coating versus conventional wash coat processes which employ heat, the simplicity of applying a relatively uniform coating, and the ability to readily control the coating thickness.

We claim:

1. A method for coating a substrate with photocatalytic semiconductor, comprising:
   a. mixing photocatalytic semiconductor powder with water to form a mixture having a pH;
   b. acidifying said mixture to inhibit agglomeration of said powder;
   c. sonicating said mixture to disperse said powder;
   d. coating the substrate with said sonicated mixture; and
   e. illuminating said coated substrate with UV to dry and harden said coating, wherein such drying and hardening is accomplished without substantially heating said coated substrate.

2. A method as in claim 1 further comprising the step of reducing the surface tension of said mixture via the addition of alcohol.

3. A method as in claim 1 wherein said pH is reduced by adding hydrogen chloride to said mixture.

4. A method as in claim 1 wherein said photocatalytic semiconductor is: tin dioxide ($SnO_2$), titanium dioxide ($TiO_2$), zinc oxide (ZnO), tungsten trioxide ($WO_3$), lead oxide (PbO), iron titanium trioxide ($FeTiO_3$), vanadium pentoxide ($V_2O_5$), iron oxide ($Fe_2O_3$), or mixtures thereof.

5. A method as in claim 4 wherein said photocatalytic semiconductor is about 60 wt % to about 90 wt % anatase, balance rutile.

6. A method as in claim 4 wherein said photocatalytic semiconductor is about 70 wt % to about 80 wt % anatase, balance rutile.

7. A method as in claim 1 further comprising the step of utilizing an infrared filter when illuminating said coated substrate with said UV.

8. A method for coating a substrate with photocatalytic semiconductor, consisting of:
   mixing photocatalytic semiconductor powder with water to form a mixture having a pH;
   b. reducing said pH of said mixture to below about 4 to inhibit agglomeration of said powder;
   c. sonicating said mixture to disperse said powder;
   d. coating the substrate with said sonicated mixture; and
   e. illuminating said coated substrate with UV to dry and harden said coating.

9. A method as in claim 1, wherein said coated substrate is dried and hardened at substantially ambient temperature.

10. A method as in claim 1, wherein said mixture is acidified by adding acid to said mixture to attain a pH below about 4.

* * * * *

UNITED STATES PATENT AND TRADEMARK OFFICE
CERTIFICATE OF CORRECTION

PATENT NO : 5,593,737
DATED : January 14, 1997
INVENTOR(S): Richard A. Meinzer & Philip J. Birbara It is certified that error appears in the above-identified patent and that said Letters Patent is hereby corrected as shown below:

On the Title Page, line 5 of the Abstract, "emulsifying" should read --sonicating--.

Column 4, claim 8, line 51, insert --a.-- preceding the sentence beginning with "mixing".

Signed and Sealed this

Fourteenth Day of July, 1998

Attest:

BRUCE LEHMAN

*Attesting Officer*　　*Commissioner of Patents and Trademarks*